April 12, 1966 B. S. SAUTER 3,245,450
SELF-RETRACTING SCREW
Filed June 29, 1962 2 Sheets-Sheet 1
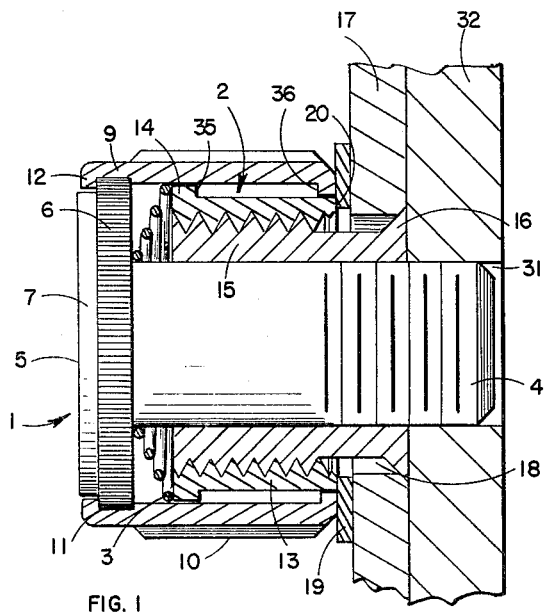
FIG. 1
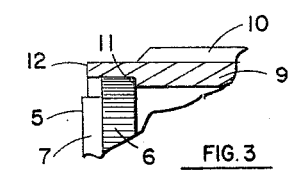
FIG. 3
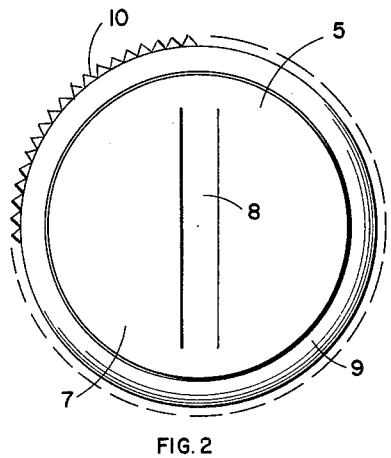
FIG. 2
FIG. 8
FIG. 7
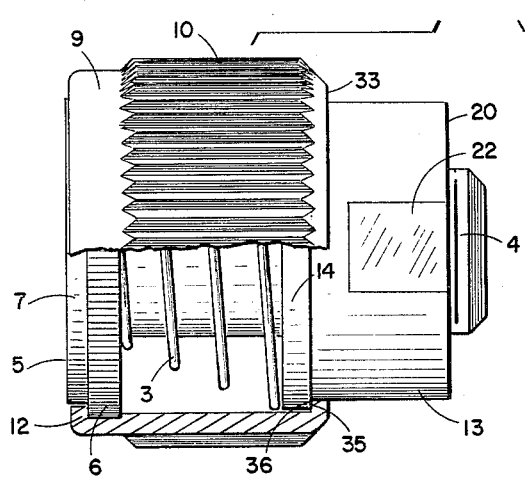
FIG. 5
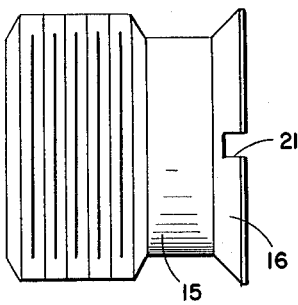
INVENTOR.
BOBBIE S. SAUTER
BY
ATTORNEY

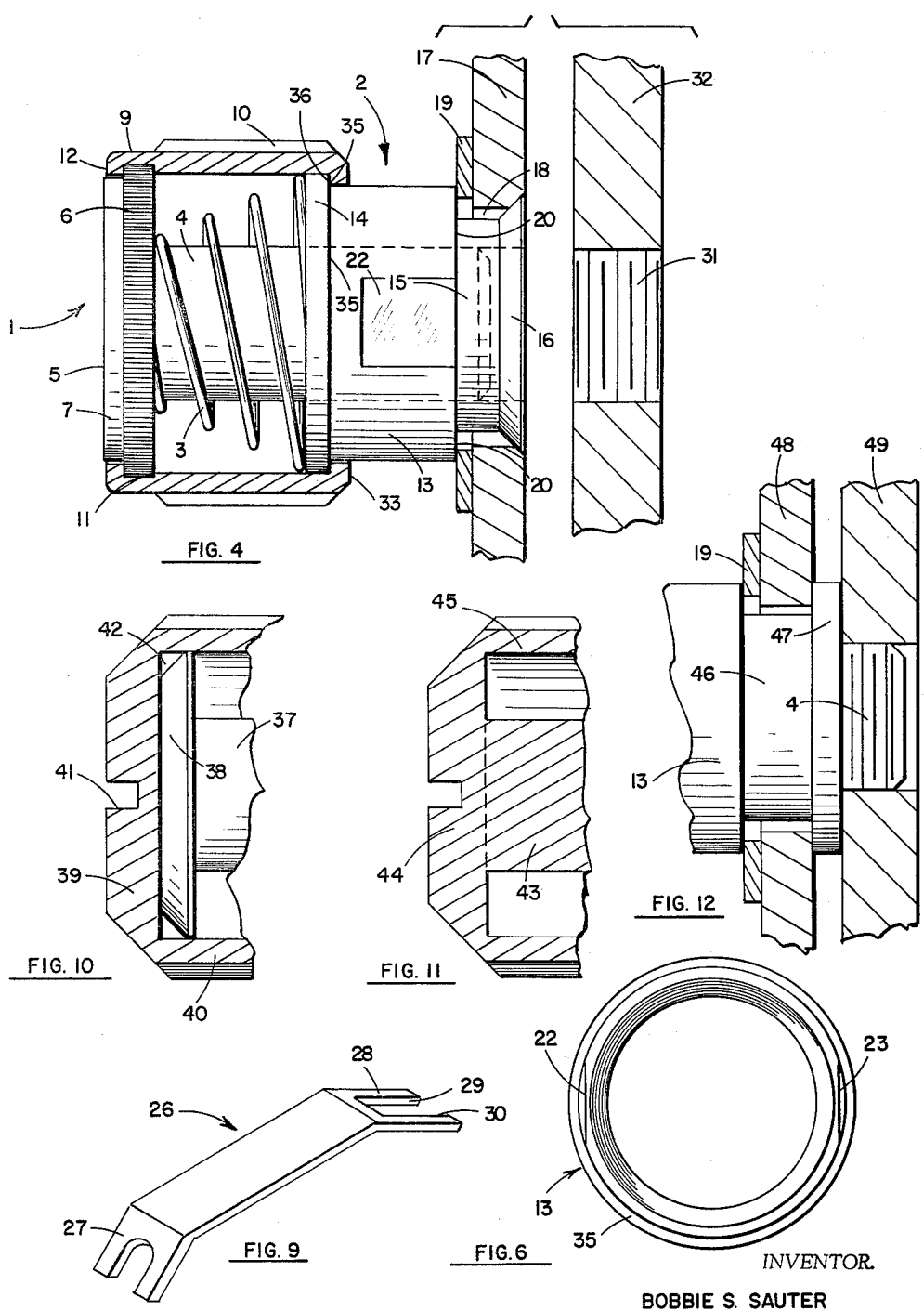

United States Patent Office 3,245,450
Patented Apr. 12, 1966

3,245,450
SELF-RETRACTING SCREW
Bobbie S. Sauter, Woodland Hills, Calif., assignor to Deutsch Fastener Corp., Los Angeles, Calif., a corporation of California
Filed June 29, 1962, Ser. No. 206,441
3 Claims. (Cl. 151—69)

This invention pertains to a fastener of the captive screw type that includes an extensible threaded element automatically retracted and retained when the fastener is released.

Despite a variety of captive screw designs proposed in the past, there has remained need for better reliability, ease of use, and simplicity in construction. The design of this invention provides a materially improved captive screw in which a retainer sleeve is internally threaded and secured to a workpiece by means of a second sleeve which is externally threaded. The latter element is inserted through an opening in the work to engage the retainer sleeve. An additional sleeve element surrounds the retainer and may be externally knurled if desired. A stud or screw element is carried at the axis of the outer sleeve and projects through the workpiece for engagement with a nut or other part with a threaded opening. A spring biases the assembly of the screw and outer sleeve to a position in which the shank is brought inwardly. Hence, when the stud is released it is automatically retracted, and can be made to entirely enter the sleeve elements. In this position a shoulder on the outer sleeve contacts a shoulder on the retainer element which secures the parts together and limits the travel.

Accordingly, it is an object of this invention to provide a captive screw fully retractable, and capable of providing a flush surface at the workpiece if desired.

Another object of this invention is to provide a self-retracting screw of simplified economical construction embodying a minimum number of parts.

A further object of this invention is to provide a retractable screw that is retained to the workpiece by a simplified threaded connector.

These and other objects will become apparent from the following detailed description taken in connection with the accompanying drawing in which:

FIG. 1 is a longitudinal sectional view of the fastener of this invention in the secured position, FIG. 2 is an end elevational view of the arrangement of FIG. 1, FIG. 3 is a fragmentary sectional view illustrating the lip on the outer sleeve prior to being bent over and secured to the stud element, FIG. 4 is a longitudinal sectional view similar to FIG. 1 but with the fastener released and in its retracted position, FIG. 5 is a side elevational view of the fastener of this invention separated from the work, FIG. 6 is an end elevational view of the retainer sleeve, FIG. 7 is an end elevational view of the keeper sleeve, FIG. 8 is a fragmentary sectional view taken along line 8—8 of FIG. 1 illustrating the manner in which the stud and outer sleeve are coupled together, FIG. 9 is a perspective view of a tool for assembling the keeper and retainer sleeves, FIG. 10 is a fragmentary longitudinal sectional view illustrating an alternate means of connecting the screw element to the outer sleeve, FIG. 11 is a fragmentary longitudinal sectional view of an embodiment in which the stud and outer sleeve are integral, and FIG. 12 is a fragmentary sectional view illustrating a modification of the keeper sleeve head.

With reference to FIG. 1 of the drawing, the device of this invention includes a screw or stud assembly 1, and a retainer assembly 2. Additionally, a spring 3 is provided internally of the fastener between the retainer assembly and the assembly 1.

In the embodiment of FIGS. 1 through 5 the screw assembly 1 is in two parts the inner portion of which includes a shank 4 threaded at one end. The opposite end of shank 4 carries a head 5. The latter portion of the unit includes a radially projecting flange 6 and a central cylindrical section 7 of reduced diameter. A suitable recess 8 is included in the portion 7 for engagement with a driving tool. While illustrated as an externally threaded stud, the shank 4 optionally may include a threaded recess, intended for association with a male threaded member.

The outer section of the assembly 1 comprises a cylindrical sleeve 9 circumscribing the shank 4. To facilitate manual rotation, a major portion 10 of the exterior of sleeve 8 may be knurled, as best seen in FIGS. 2 and 5.

The end of the sleeve 8 adjacent the head 5 is annularly recessed to define a shoulder 11 which engages the undersurface of flange 6. A lip 12 is bent over the other radial face of flange 6, thereby securing the sleeve 9 to the head 5. The circumferential surface of the flange 6 is provided with a straight knurl, or other projection, while digs into the interior of the sleeve 9 to couple the sleeve to the head. This means, therefore, that the sleeve 9 is connectd to the head 5 for all types of movement including rotation.

The manner in which the head 5 and sleeve 9 are assembled may be seen by reference to FIG. 3. The lip 12 initially extends longitudinally with respect to the sleeve 9, forming simply a continuation of the sleeve. This permits the head 5 to be inserted into the sleeve so that the inner radial face of the flange 6 can be brought into engagement with shoulder 11. The sleeve and flange 6 are dimensioned such that this is a force fit. Hence, as the sleeve and head are pushed together the teeth formed by the knurl on the exterior of the flange 6 are caused to become embedded in the inner circumferential wall of the sleeve 9 (see FIG. 8). As a result, the sleeve becomes coupled to the screw so that rotation of the sleeve likewise will rotate the shank 4. With the head inserted into the sleeve in the position of FIG. 3, the lip 12 then is bent inwardly to assure that the head will not become dislodged from the sleeve. This attaches the members 5 and 9 together with a minimum of expense when the fastener is being produced in volume.

The retainer assembly 2 includes a sleeve 13 inserted into the outer element 9 prior to the association of the stud 4 and head 5 with the outer sleeve. The retainer sleeve 13 includes an inner end wall 14 which is apertured to provide a clearance opening around stud 4. The opposite end of the sleeve 13 is internally threaded, as illustrated. The retainer 13 is shorter than the outer sleeve element 9 leaving a space for the spring 3 beyond the end wall 14. The spring is inserted into outer element 9 after retainer 13 and before entry of stud 4.

The keeper sleeve 15 of assembly 2 is not connected to the remainder of the fastener unit until the fastener is associated with the workpiece. The element 15 also is of cylindrical tubular form, being externally threaded at one end for engagement with the threads of the retainer 2. An outwardly projecting flange 16 extends from the opposite end of the keeper 15 defining a head which if desired may be given a countersunk configuration, as illustrated.

In use of the device of this invention the workpiece, such as sheet member 17, is provided with an aperture 18 through which the keeper 15 is inserted. For flush installations the opening 18 is countersunk to complementarily receive the head 16 of the keeper. The other portion of the sleeve assembly 2 is secured to the keeper by interengagement of the threads on the members 13 and 15. Preferably a washer 19 is interposed between the end 20 of sleeve 13 and the workpiece 17.

Suitable notches 21 may be provided in the head 16 of the keeper 15 to facilitate rotation of this element. Similarly, opposed flat surfaces 22 and 23 are included on the exterior of sleeve 13 to permit it to be gripped in accomplishing such relative movement.

A simple tool 26 may be used for assembly of the fastener parts (see FIG. 9). This includes a bifurcated end 27 adapted to enter slots 21 in the head of sleeve 15. The other forked end 28 defines parallel spaced walls 29 and 30 intended to engage flat surfaces 22 and 23 of the sleeve 13. While conventional tools may be employed, the use of two of the wrenches 26 makes assembly of the fastener particularly easy.

The parts are threaded together until the end 20 of sleeve 13 is drawn tight against washer 19. The threaded connection between the members 13 and 15 allows for a variation in thickness of the workpiece with which the fastener is associated, while assuring that a secure attachment always is obtainable. The threaded connection also has the advantage of being simple to accomplish, avoiding the complexities of welds, lock rings, or other expedients.

With the members 13 and 15 threaded together, the threaded shank 4 may be extended beyond the workpiece 17 to engage a threaded opening 31 in any type of adjacent member such as a nut or the sheet 32 shown. Axial movement of shank 4 is in opposition to the force of spring 3. When in the tightened position, the end 33 of the sleeve 9 contacts the surface of the washer 19. The rotation of the shank 4 in connecting it within the threaded opening may be accomplished either by manually turning the sleeve 9, or by rotating head 5 by means of a driving tool in the slot 8.

Of course the fastener is released by reverse rotational movement of the shank 4. When the threaded opening 31 is disengaged by the stud, the spring 3 biases the assembly 1 so as to retract the stud 4 within the sleeve elements. Thus as the invention is illustrated, the assembly 1 moves to the left in response to the spring force to assume the position shown in FIG. 4. This movement may be made sufficient to entirely withdraw the shank 4 into the fastener unit so that it does not project beyond the head 16 of the keeper 15. In this manner, a flush surface is obtained at the workpiece 17 when the fastener is released.

Movement to the retracted position is limited by interengagement of the shoulders on the sleeves 13 and 9. End wall 14 of sleeve 13 projects outwardly to define shoulder 35 which is contacted by an inwardly extending shoulder 36 on the sleeve 9. The latter shoulder is located at the end 33 of the outer sleeve so that the assembly 1 moves virtually the entire length of the retainer sleeve 13 before the shoulders are brought into interengagement. Thus, considerable axial movement is possible and full retraction can be obtained. The shoulders provide a simple and effective means for appropriately limiting the travel of the assembly 1 relative to the retainer sleeve, while assuring that the fastener is securely retained together and that the various parts will not become separated.

The arrangement by which the assembly 1 is constructed is subject to some possible variations. As illustrated in FIG. 10, the unit is brazed together rather than utilizing an interfering mechanical lock, as in the previously described embodiment. In the design of FIG. 10, the shank 37 terminates in a relatively thin, flat head 38. This head portion engages the inner radial face of the end 39 of the outer sleeve 40. The wall 39 is made sufficiently thick to include a driving slot 41 to receive the bit of a screw driver. The sleeve 40 may be externally knurled, if desired, as was sleeve 11.

The head 38 may be beveled at its peripheral edge tapering inwardly away from the shank 37. This leaves an annular recess 42 between the head 38 and the end wall 39 of the outer sleeve 40. Recess 42 may serve as a receptacle for brazing material used in securing the head 38 to the outer sleeve 40. This permits a secure attachment to be effected by furnace brazing. Of course, soldering or welding likewise could be utilized as the connecting arrangement.

A further modification may be seen in FIG. 10 where the rotatable portions of the device are made integral. Thus as seen in FIG. 11, the shank 43 forms a continuation of the end 44 of the outer sleeve 45. Hence, by the arrangement of FIG. 10, all connecting processes are avoided and the outer sleeve and shank are one piece and always will turn together.

The keeper sleeve also is capable of some variation, depending upon the use to which the fastener is to be put. As seen in FIG. 12 the sleeve 46 has a flat head 47 that lies along the exterior surface of workpiece 48. This contrasts with the countersunk arrangement for the sleeve 15 described above. In some instances it is desirable to space workpiece 49 from the sheet 48. This is accomplished by the protruding head 47 that is interposed between the members 48 and 49 when the fastener is secured. In this embodiment, therefore, the head of the keeper sleeve performs the dual functions of holding the keeper sleeve in place and of maintaining a predetermined separation between the elements fastened. Of course the flat head 47 can be recessed beneath the surface of either member 48 or 49 where the parts are to be secured in contact with each other.

From the foregoing it can be seen that I have provided an improved captive screw arrangement characterized by simplified construction and greater ease of use. The threaded connection between the keeper and the retainer sleeve facilitates the installation of the unit, as well as permitting the device to be utilized with parts of varying thicknesses. The unit can be constructed to allow a maximum amount of axial travel of the threaded shank, so that if desired full retraction is possible. Nevertheless, the movement of the outer rotatable element is limited by the interference of the shoulders on the outer sleeve and the retainer sleeve so that the parts never can become separated or lost.

The foregoing detailed description is to be clearly understood as given by way of illustration and example only, the spirit and scope of this invention being limited solely by the appended claims.

I claim:

1. A fastener comprising
    a keeper assembly,
    a stud assembly,
        said keeper assembly including a first sleeve having a head portion at one end thereof and a threaded portion at the opposite end thereof, and a second sleeve,
            said second sleeve threadably receiving said second end of said first sleeve,
            said second sleeve including an end adjacent said head portion of said first sleeve whereby said first and second sleeves are attachable to a workpiece with said first sleeve extending through an aperture therein,
            said second sleeve including an outwardly projecting shoulder at the opposite end portion thereof,
        said stud assembly including an elongated threaded member one end of which reciprocatively extends through said first and second sleeves of said keeper assembly for engagement with a threaded workpiece,
            an outwardly extending head at the opposite end of said elongated threaded member, and a tubular section extending from said head around said first and second sleeves, said tubular section having an end wall remote from said head for engagement with a workpiece engaged by said second sleeve, said head having a flange provided with axially extending serrations, said tubular section having an annular shoulder inwardly of the opposite end thereof, one side of said flange engaging said shoulder, said tubular section having an inwardly bent lip extending over peripheral portions of the opposite side of said flange whereby said shoulder and said inwardly bent lip secure said head to said tubular section, said serrations being embedded in the inner wall of said tubular section intermediate said lip and said shoulder of said tubular section for thereby rotationally coupling said head and said tubular section, said tubular section having an inwardly extending shoulder adjacent said end wall thereof, and resilient means engaging said second sleeve and said stud assembly for biasing said stud assembly axially with respect to said keeper assembly to a position in which said shoulder on said second sleeve engages said shoulder on said tubular portion, whereby said shoulders preclude separation of said stud assembly from said keeper assembly and said elongated threaded member is withdrawn inwardly with respect to said first and second sleeves.

2. A fastener comprising
a keeper assembly,
a stud assembly, said keeper assembly including a duality of threadably engaged sleeves adapted for attachment to, and to extend through an opening in, a workpiece to be fastened, said stud assembly including an elongated threaded element reciprocatively extending into said duality of sleeves, said threaded element having an end portion extensible beyond said duality of sleeves for threadably engaging a second workpiece, said stud assembly including an outer portion extending around said duality of sleeves, and resilient means interposed between said keeper assembly and said stud assembly for biasing said end portion of said threaded element inwardly of said duality of sleeves, said outer portion and said duality of sleeves having interengageable shoulder means for limiting relative movement of said stud assembly and keeper assembly in response to said resilient means, said elongated threaded element and said outer portion including interengaging tooth means coupling said elongated threaded element and said outer portion together, said tooth means including a flange on said threaded element having projections embedded into interior surface portions of said outer portion, said outer portion having inwardly extending shoulder means on either side of said flange for precluding axial movement of said flange relative to said outer portion.

3. A fastener device comprising
a first sleeve having a head at one end and exterior threads at the other end,
a second sleeve, said second sleeve having interior threads at one end engaging said threads on said first sleeve, and an outwardly projecting shoulder at the opposite end, a stud reciprocatively received in said first and second sleeves, said stud having a threaded end extensible beyond said first sleeve for engagement with a threaded workpiece, and a head at the opposite end of said stud exteriorly of said sleeves, a third sleeve means extending from said head around said stud and said first and second sleeve, said third sleeve means having an end intermediate said ends of said second sleeve, said end of said third sleeve means having an inwardly extending shoulder engageable with said shoulder on said second sleeve for retaining said sleeves together, said head of said stud including an axially outer section of reduced diameter, and having a radially extending flange axially inward thereof, said flange having axially extending tooth means on the periphery thereof interferingly engaging inner portions of said third sleeve means for rotatably coupling said head and said third sleeve means together, said third sleeve means having a second shoulder engaging said flange on one side thereof, and an inwardly bent lip engaging said flange on the opposite side thereof adjacent said outer section of said head, and a compression spring interposed between said opposite end of said second sleeve and said head for biasing said threaded end of said stud into said first and second sleeves and said shoulders into interengagement.

References Cited by the Examiner
UNITED STATES PATENTS

| | | | |
|---|---|---|---|
| 1,166,345 | 12/1915 | Gates | 151—41.7 |
| 2,331,322 | 10/1943 | Heinick | 151—41.76 |
| 2,553,236 | 5/1951 | Bratfisch | 85—40 |
| 2,831,520 | 4/1958 | Clarke | 151—69 |
| 2,967,557 | 1/1961 | Tait et al. | 151—69 |
| 3,033,260 | 5/1962 | Snow. | |
| 3,059,736 | 10/1962 | Boyd | 151—69 |

CARL W. TOMLIN, *Primary Examiner.*

EDWARD C. ALLEN, M. HENSON WOOD, JR.,
*Examiners.*